US011263939B2

(12) United States Patent
Zhou et al.

(10) Patent No.: US 11,263,939 B2
(45) Date of Patent: Mar. 1, 2022

(54) DISPLAY CONTROL METHODS AND APPARATUSES, FLEXIBLE DISPLAY DEVICES FOR ADJUSTING DISPLAY PIXEL DENSITY

(71) Applicant: BEIJING ZHIGU RUI TUO TECH CO., LTD., Beijing (CN)

(72) Inventors: Liang Zhou, Beijing (CN); Lin Du, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 247 days.

(21) Appl. No.: 15/543,162

(22) PCT Filed: Jan. 7, 2016

(86) PCT No.: PCT/CN2016/070370
§ 371 (c)(1),
(2) Date: Jul. 12, 2017

(87) PCT Pub. No.: WO2016/112823
PCT Pub. Date: Jul. 21, 2016

(65) Prior Publication Data
US 2018/0033356 A1    Feb. 1, 2018

(30) Foreign Application Priority Data

Jan. 16, 2015  (CN) .......................... 201510024235.9

(51) Int. Cl.
*G06T 3/40*   (2006.01)
*G09G 5/14*   (2006.01)
(Continued)

(52) U.S. Cl.
CPC ............... *G09G 3/007* (2013.01); *G06T 3/40* (2013.01); *G09G 5/003* (2013.01); *G09G 5/14* (2013.01);
(Continued)

(58) Field of Classification Search
CPC .......... G09G 3/007; G09G 3/20; G09G 5/003; G09G 5/14; G09G 3/3648; G06F 1/1601
See application file for complete search history.

(56) References Cited

U.S. PATENT DOCUMENTS 5,689,283 A * 11/1997 Shirochi ........... C03B 37/01486
345/213
6,077,226 A *  6/2000 Washburn ................ A61B 8/06
600/443
(Continued)

FOREIGN PATENT DOCUMENTS

CN       102402929 A       4/2012
CN       102509344 A       6/2012
(Continued)

OTHER PUBLICATIONS

International Search Report and Written Opinion for Application No. PCT/CN2016/070370, dated Mar. 24, 2016, 10 pages.
(Continued)

*Primary Examiner* — Ke Xiao
*Assistant Examiner* — James S Nokham
(74) *Attorney, Agent, or Firm* — Sheppard Mullin Richter & Hampton LLP

(57) ABSTRACT

Embodiments of the present application disclose various display control methods and apparatuses and various display devices, wherein one of the display control methods comprises: adjusting display pixel density of at least one display unit in a display array as uneven distribution; and displaying multiple first images respectively via multiple display units in the adjusted display array, to splice and/or superimpose the multiple first images to be displayed as a second image, the multiple display units comprising the at least one display unit. The present application can increase the actual utiliza- (Continued)

tion rate of display pixels of the display array, and improve splicing and/or image local display quality.

19 Claims, 12 Drawing Sheets

(51) Int. Cl.
  *G09G 3/00* (2006.01)
  *G09G 5/00* (2006.01)
(52) U.S. Cl.
  CPC ........... *G09G 2300/026* (2013.01); *G09G 2300/0439* (2013.01); *G09G 2340/0407* (2013.01); *G09G 2340/0457* (2013.01)

(56) References Cited

U.S. PATENT DOCUMENTS

| | | | | |
|---|---|---|---|---|
| 6,661,425 B1* | 12/2003 | Hiroaki | ........... | G09G 3/003 345/1.1 |
| 2006/0056726 A1* | 3/2006 | Fujiwara | ........... | G06T 15/08 382/276 |
| 2006/0109391 A1* | 5/2006 | Huitema | ........... | G09G 3/3611 349/19 |
| 2008/0030527 A1 | 2/2008 | Namie et al. | | |
| 2008/0118139 A1* | 5/2008 | Huo | ........... | G06T 5/40 382/132 |
| 2008/0224951 A1* | 9/2008 | Alberth | ........... | G06F 1/1601 345/55 |
| 2009/0219225 A1* | 9/2009 | Cope | ........... | G09F 9/30 345/55 |
| 2009/0243983 A1* | 10/2009 | Ohashi | ........... | G09G 3/3648 345/89 |
| 2009/0289877 A1* | 11/2009 | Kwon | ........... | G02F 1/133305 345/82 |
| 2010/0033405 A1 | 2/2010 | Aragaki et al. | | |
| 2012/0019465 A1 | 1/2012 | Chen et al. | | |
| 2012/0188245 A1 | 7/2012 | Hyatt | | |
| 2013/0258460 A1* | 10/2013 | Liou | ........... | G02B 27/2214 359/463 |
| 2013/0321740 A1* | 12/2013 | An | ........... | H05K 5/0217 349/58 |
| 2014/0015743 A1* | 1/2014 | Seo | ........... | G06F 1/3265 345/156 |
| 2014/0055394 A1* | 2/2014 | Park | ........... | H01L 41/0825 345/173 |
| 2014/0232722 A1 | 8/2014 | Deluca | | |
| 2014/0270505 A1* | 9/2014 | McCarthy | ........... | G06K 9/3266 382/165 |
| 2014/0285477 A1* | 9/2014 | Cho | ........... | G09G 3/2003 345/207 |
| 2015/0189140 A1* | 7/2015 | Sutton | ........... | H04N 5/2257 348/208.1 |
| 2017/0116734 A1* | 4/2017 | Van Leeuwen | ........... | G06T 7/0014 |

FOREIGN PATENT DOCUMENTS

| | | |
|---|---|---|
| CN | 102645779 A | 8/2012 |
| CN | 102930823 A | 2/2013 |
| CN | 104157660 A | 11/2014 |
| CN | 104243823 A | 12/2014 |
| CN | 104537975 A | 4/2015 |
| JP | 2010-122288 A | 6/2010 |

OTHER PUBLICATIONS

Bar-Cohen, Y., "Electroactive polymers for refreshable Braille displays," SPIE, 2009, 3 pages.
Maimone et al., "Focus 3D: Compressive Accommodation Display," ACM Transactions on Graphics, 2013, 12 pages.
Nagano, et al., "An Autostereoscopic Projector Array Optimized for 3D Facial Display," USC Institute for Creative Technologies, SIGGRAPH 2013, 2 pages.
Pelican Imaging: Life in 3D, "PiCam: An Ultra-Thin High Performace Monolithic Camera," downloaded from website http://www.pelicanimaging.com/technology on Jun. 13, 2017, 30 pages.
Wilburn et al., "High Performance Imaging Using Large Camera Arrays," SIGGRAPH, 2005, p. 765-776.
Yu et al., "Directed bending of a polymer film by light," Nature, Sep. 2003, vol. 425, p. 145.

* cited by examiner

DISPLAY CONTROL METHODS AND APPARATUSES, FLEXIBLE DISPLAY DEVICES FOR ADJUSTING DISPLAY PIXEL DENSITY

CROSS-REFERENCE TO RELATED APPLICATIONS

The present application is a National Phase Application of International Application No. PCT/CN2016/070370, filed on Jan. 7, 2016, which claims priority to and benefit of Chinese Patent Application No. 201510024235.9, filed on Jan. 16, 2015, and entitled "Display Control Methods and Apparatuses and Display Devices". Both of the above-referenced applications are incorporated into the present application by reference herein in their entirety.

Technical Field

The present application generally relates to the field of display technologies, and in particular, to various display control methods and apparatuses and various display devices.

Background

Image processing covers image collection, image display and other aspects. With continuous improvement of image processing technologies, image collection resolution and image display resolution have been greatly improved, but in view of the trend of technological development, image collection capability and collected information dimension of a single display unit are higher than image display capability of the single display unit, that is, the image collection resolution is higher than the image display resolution. In order to match the image collection resolution, a display unit usually needs to splice multiple display units together, to improve overall image display resolution and a viewing-angle range.

SUMMARY

A brief summary about the present application is given hereinafter, so as to provide a basic understanding about certain aspects of the present application. It should be understood that the summary is not an exhaustive summary about the present application. It is neither intended to determine critical or important parts of the present application, nor intended to limit the scope of the present application. Its purpose is merely giving some concepts in a simplified form, to be taken as the preamble of the detailed description.

The present application provides various display control methods and apparatuses and various display devices.

In one aspect, embodiments of the present application provide a display control method, comprising:

adjusting display pixel density of at least one display unit in a display array as uneven distribution; and displaying multiple first images respectively via multiple display units in the adjusted display array, to splice and/or superimpose the multiple first images to be displayed as a second image, the multiple display units comprising the at least one display unit.

In another aspect, the embodiments of the present application further provide a display control apparatus, comprising:

a display pixel density adjustment module, configured to adjust display pixel density of at least one display unit in a display array as uneven distribution; and a display control module, configured to display multiple first images respectively via multiple display units in the adjusted display array, to splice and/or superimpose the multiple first images to be displayed as a second image, the multiple display units comprising the at least one display unit.

In a further aspect, the embodiments of the present application further provide a display device, comprising a display array and any one of the display control apparatuses provided in the embodiments of the present application, the display array and the display control apparatus being in a communication connection.

The technical solutions provided in the embodiments of the present application can make full use of overall pixels of at least one display unit in a display array to present differentiated display definition of different regions of a first image, equivalent to performing corresponding adjustment on existing display pixel density distribution of the at least one display unit to achieve an effect of according different display pixel density to different display regions of the at least one display unit for image display, to cause definition of different regions of an image displayed by the at least one display unit to vary. In this way, when multiple display units display respective first images, definition of a second image obtained by splicing and/or superimposing the first images of which the definition is displayed differently, or obtained by splicing and/or superimposing the first images of which the definition is displayed differently and other first images, also presents corresponding uneven distribution, for example, a local part of the second image is clearer than other parts. This helps to, on top of giving full play to advantages such as resolution gain and wide viewing angle of image display performed by the display array, further achieve matching between display resolution of a local part of an actual displayed image and high collection resolution of the image based on the display array, therefore increasing an actual utilization rate of display pixels of the display array, and local display quality of the splicing and/or the image, and satisfying the users' differentiated display demands for the local part of the image.

These and other advantages of the present application will be more evident through the following detailed description about alternative embodiments of the present application with reference to the accompanying drawings.

BRIEF DESCRIPTION OF THE DRAWINGS

The present application can be better understood with reference to the description given below in combination with the accompanying drawings, in which the same or similar reference symbols are used in all the drawings to indicate the same or similar components. The drawings together with the following detailed description are included in the specification and form a part of the specification, and are presented to further exemplify alternative embodiments of the present application and explain the principles and advantages of the present application. In the drawings.

Figure 1A:
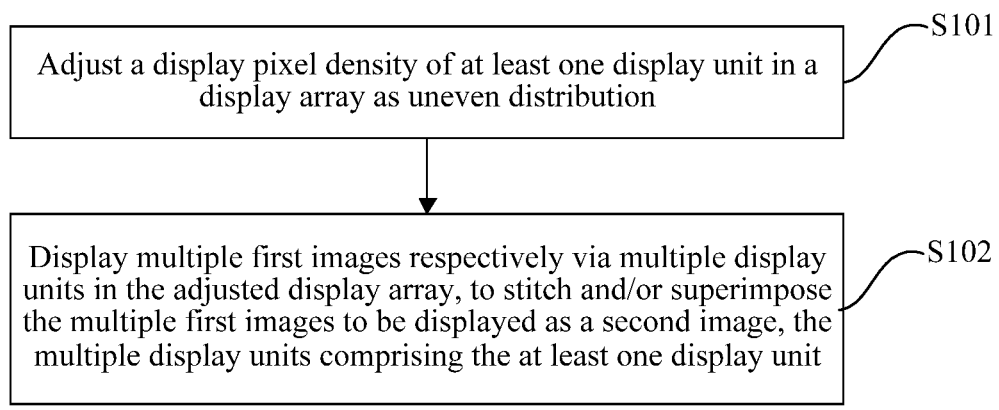
FIG. 1a is a flowchart of an image display control method according to one embodiment of the present application.

Those skilled in the art should understand that, elements in the drawings are merely illustrated for the sake of simplicity and clarity, and may not be drawn to scale. For example, sizes of certain elements in the drawings may be amplified relative to other elements, so as to help to improve the understanding about the embodiments of the present application.

DETAILED DESCRIPTION

Exemplary embodiments of the present application are described below in detail with reference to the accompanying drawings. For the sake of clarity and simplicity, not all the features of actual implementations are described in the specification. However, it should be understood that, many decisions specific to implementations must be made during development of any such actual embodiment, so as to achieve specific goals of developers, for example, restrictions relevant to systems and services need to be met, and the restrictions may vary with different implementations. In addition, it should also be understood that, although development work is likely to be very complicated and time-consuming, those skilled in the art will likely benefit from the disclosure in actual implementation.

Herein, it should also be noted that, in order to avoid blurring the present application due to unnecessary details, only apparatus structures and/or processing steps closely related to solutions according to the present application are described in detail in the accompanying drawings and the specification, but representation and description about members and processing having little to do with the present application and known to those of ordinary skill in the art are omitted.

Specific implementations of the present application are described in detail hereinafter with reference to the accompanying drawings and embodiments (in which the same elements are denoted by the same reference numerals wherever possible). The following embodiments are intended to describe the present application, but not to limit the scope of the present application.

It should be understood by those skilled in the art that the terms such as "first" and "second" in the present application are merely intended to distinguish different steps, devices or modules, etc., which neither represent any particular technical meaning nor indicate a necessary logical sequence between them.

FIG. 1a is a flowchart of a display control method according to one embodiment of the present application. An execution body of the display control method according to the embodiment of the present application may be a certain display control apparatus, and the display control apparatus may perform image display control by executing the display control method during execution of applications, which include but are not limited to, image display and video playback. Device manifestations of the display control apparatus may vary, for example, the display control apparatus may be a certain separate component, and the component cooperates with the display array for communications; or the display control apparatus may be integrated, as a certain functional module, into a display device comprising a display array, which is not limited in the embodiments of the present application.

Specifically, as shown in FIG. 1a, the display control method according to the embodiment of the present application comprises:

S101: Adjust display pixel density of at least one display unit in a display array as uneven distribution.

The display array may comprise N×M display units array-distributed, wherein N is an integer greater than or equal to 1 and M is an integer greater than 1, or N is an integer greater than 1 and M is an integer greater than or equal to 1.

The display units in the display array are homogeneous or at least part of the display units are heterogeneous. Arrays of the display units may be arranged according to actual needs of image display, for example, the display units are array-distributed on the same plane, or the display units are array-distributed on an arc-shaped surface, and so on. A display unit may include multiple display pixels, and one of the display pixels may comprise, but is not limited to, at least one light-emitting unit; the light-emitting unit may comprise, but is not limited to, a Light Emitting Diode (LED) light-emitting unit and an Organic Light Emitting Diode (OLED) light-emitting unit; emitting color of one of the light-emitting units may be determined according to actual needs; the light-emitting unit may comprise, but is not limited to, one or more light-emitting sub-units, and the light-emitting sub-units may comprise LED light-emitting sub-units and OLED light-emitting sub-units; and the multiple light-emitting sub-units may comprise, but are not limited to, LED light-emitting sub-units and OLED light-emitting sub-units in different colors such as red (R), green (G) and blue (B).

At least one display unit in the display units comprised in the display array is a display unit with adjustable display pixel density. The display unit with adjustable display pixel density may comprise, but is not limited to, a flexible display unit, and the flexible display unit at least comprises a flexible substrate and multiple display pixels formed on the flexible substrate, wherein the flexible substrate may adjust display pixel density distribution thereof through expansion and contraction, bending or other changes when meeting certain conditions.

In combination with the characteristic that the display pixel density distribution of the display unit is adjustable, the embodiments of the present application may adjust display pixel density of at least one display unit in a display array as uneven distribution, to cause resolution of an image displayed by the display unit whose display pixel density has been adjusted to present uneven distribution.

S102: Display multiple first images respectively via multiple display units in the adjusted display array, to splice and/or superimpose the multiple first images to be displayed as a second image, the multiple display units comprising the at least one display unit.

In an actual application where image display is performed via the adjusted display array, multiple display units of the display units in the display array participate in the image display, the multiple display units participating in the image display comprise one or more display units whose display pixel density is adjusted as uneven distribution. Each display unit participating in the image display respectively displays a first image. The first images indicate images displayed separately by the display units, and are images before splicing and/or superimposition display; the first images displayed by different display units may be the same or the first images displayed by at least part of the display units are different. The first images displayed by the multiple display units respectively are spliced and/or superimposed into a second image in a display space, that is, the second image indicates an image displayed after splicing and/or superimposition of the multiple first images.

In the process of practicing the embodiments of the present application, the inventor of the present application has found that using a display array to perform image display can, to some extent, improve resolution and/or a viewing angle range of the image display, and facilitate better matching of actual display resolution of the image with image collection resolution; for example, it is feasible to generate multiple images with lower resolution according to a collected high-resolution image and display the multiple images with lower resolution via multiple display units of the display array respectively, to cause the images with lower resolution displayed respectively by the multiple display units to be superimposed and displayed in a space, thus compensating for the deficiency of display capability of a single display unit and improving overall display resolution of the image and other qualities; for another example, it is feasible to segment a collected image into multiple sub-images and display the multiple sub-images via multiple display units in the display array respectively, to cause the sub-images displayed by the multiple display units respectively to be spliced and displayed in the space, thus improving overall display spatial resolution of the images and other qualities; and so on.

In addition, the display array technology is also widely applied to 3D display. As 3D display needs to display visual information (such as parallax information) having higher dimensions relative to 2D images, therefore, data volume to be processed by 3D display per time unit for displaying images with the same image spatial resolution is multiple times that of ordinary 2D display (such as 100 times). Theoretically, increasing data processing volume (such as time division, space division and other data processing volume) of a display system per time unit can enhance display quality, but due to the cost, volume, power consumption and other constraint factors of the display system, display quality (e.g., spatial resolution) of many current 3D display systems are not satisfactory compared with the traditional 2D display. However, using the technical solution provided in the embodiment of the present application for 3D display control can, on the premise of certain data processing volume (such as a certain number of display pixel points) of a display device, perform differential distribution adjustment on a finite number of display pixels of at least one display unit by adjusting display pixel density distribution of the at least one display unit in a display array, to achieve differential image display effects of different regions or different parallax information of the overall image, for example, image display effects of images in a region that a user is interested in can be improved and so on, thus improving the actual utilization rate of the display pixels and improving image display quality of at least part thereof and so on.

In the image display process, the display pixel density distribution of the display units is usually fixed, and when image display is performed based on display units whose display pixel density is fixed, the display capability of the display units has certain limitations in aspects such as matching higher image collection resolution and meeting users' diversified application demands. In certain scenarios, regions in a certain frame image generally have different meaning and/or importance for a user, that is, the user may have different degrees of interest in different regions of the displayed image, for example, in a character image display scene, the user is more interested in a human face in the image than in scenery in the image, and so on. If image display quality of a Region of Interest (ROI) is to be improved, it may be feasible to improve overall definition of the displayed image by use of resolution of a single display unit or by increasing the number of display units in the display array, and so on. If the image is displayed by increasing resolution of display units, more power may be consumed; if the user has different requirements for display definition of different regions of an image, for example, the user may only focus on definition of a local part (such as a human face, a license plate number and other ROIs), the requirement for definition of other parts (e.g., background, road and the like) in the image is lower, and in these cases, if the image is displayed simply by use of a high resolution display screen, it may result in that the actual utilization rate of display pixels is lower and power consumption is increased.

The technical solution provided in the embodiment of the present application can make full use of overall pixels of at least one display unit in a display array to present differentiated display definition of different regions of a first image, equivalent to correspondingly adjusting existing display pixel density distribution of the at least one display unit to achieve an effect of according differentiated display pixel density to different display regions of the at least one display unit for image display, to cause definition of different regions of an image displayed by the at least one display unit to vary. In this way, when multiple display units display first images respectively, definition of a second image obtained by splicing and/or superimposing the first images whose definition is displayed differently, or obtained by splicing and/or superimposing the first images whose definition is displayed differently and other first images also presents corresponding uneven distribution, for example, a local part of the second image may be much clearer than other parts. This thus helps to, on the basis of giving full play to advantages such as resolution gain and wide viewing angle of image display performed by the display array, further achieve matching between display resolution of a local part of an actual displayed image and high collection resolution of the image based on the display array, thus increasing an actual utilization rate of display pixels of the display array, and local display quality of the splicing and/or the image, and satisfying users' differentiated display demands for the local part of the image.

After the technical solution provided in the embodiment of the present application is adopted to adjust display pixel density of at least one display unit in a display array as uneven distribution, it is feasible to determine a flexible display control technology to control the adjusted display array (comprising the adjusted at least one display unit) for image display control according to actual needs, so as to improve user experience, and the embodiment of the present application does not limit the specific display control technology.

In one optional implementation, the displaying multiple first images respectively via multiple display units in the adjusted display array comprises: sampling a first image to be displayed by the at least one display unit according to actual position information of display pixels in the adjusted at least one display unit; and displaying multiple first images respectively via multiple display units in the adjusted display array, wherein the adjusted at least one display unit displays the sampled first image. The solution can determine based on actual needs whether it is necessary to perform sampling adaptation processing on a first image to be displayed by the display unit according to actual spatial positions of display pixels of the adjusted display units. If necessary, it is feasible to sample the first image to be displayed by the display unit according to actual position information of display pixels in the adjusted at least one display unit, to achieve certain display effects on the basis that display definition of different regions of the first image varies, such as sizes, shapes and other display scales of different regions of the first image actually displayed by the adjusted display unit match sizes, shapes and other display scales of corresponding regions of the first image before processing. This may facilitate images displayed by the adjusted display unit to be correspondingly spliced and/or superimposed with images displayed by other display units in the display array in a display space, and increase local definition of the second image after splicing and/or superimposition, and better meets users' diversified application demands.

In another optional implementation, the displaying multiple first images respectively via multiple display units in the adjusted display array comprises: adjusting drive information of a first image to be displayed by the at least one display unit according to actual position information of display pixels in the adjusted at least one display unit; and displaying multiple first images respectively via multiple display units in the adjusted display array, wherein the adjusted at least one display unit is controlled to display the corresponding first image according to the adjusted drive information. This solution can determine according to actual needs whether it is necessary to perform drive adaptation adjustment on a scan drive manner of the display unit according to actual spatial positions of display pixels of the adjusted display units. If necessary, it is feasible to perform drive adaptation adjustment on the scan drive manner of the display unit according to actual spatial positions of display pixels of the adjusted display units, to cause certain display effects on the basis that display definition of different regions of the first image varies, such as display scales of different regions of the first image actually displayed by the adjusted display unit match actual scales of corresponding regions of the first image. This may facilitate images displayed by the adjusted display unit to be correspondingly spliced and/or superimposed with images displayed by other display units in the display array in a display space, increase local definition of the second image after splicing and/or superimposition, and better meets users' diversified application demands.

Image display effects of any display unit after display pixel density is adjusted is illustrated further in combination with FIG. 2a to FIG. 2d; this part is only illustrative and should not be construed as a limitation to the essence of the technical solution of the present application.

Figure 2A:
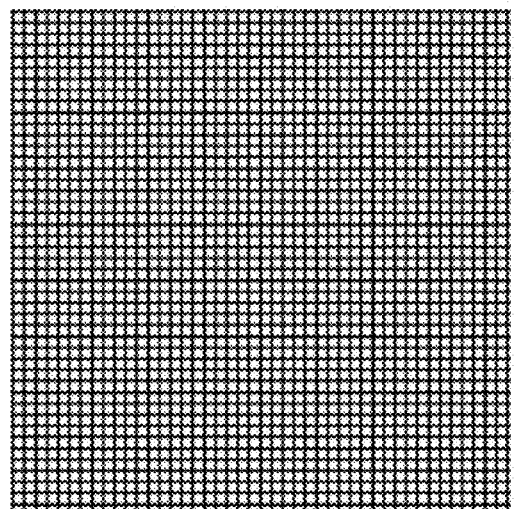
FIG. 2a is an optional example of display pixel density distribution of a display unit before adjustment according to one embodiment of the present application.
Figure 2B:
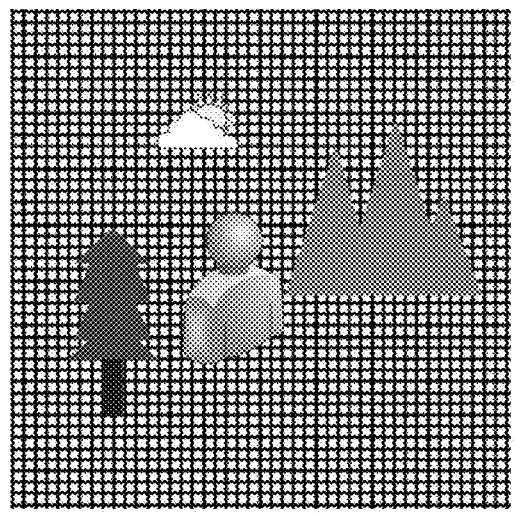
FIG. 2b is an optional example of a display effect according to an image displayed by a display unit before adjustment according to one embodiment of the present application.

For display pixel density distribution of any display unit in the display array before adjustment, as shown in FIG. 2a, display pixel density is even, according to the first image displayed by the display unit before adjustment, the display pixel density of different regions (such as human, tree, sun and other different regions) of the first image that the display unit is configured to display is the same, thus definition of different regions of the first image actually displayed is the same, as shown in FIG. 2b.

Figure 2C:
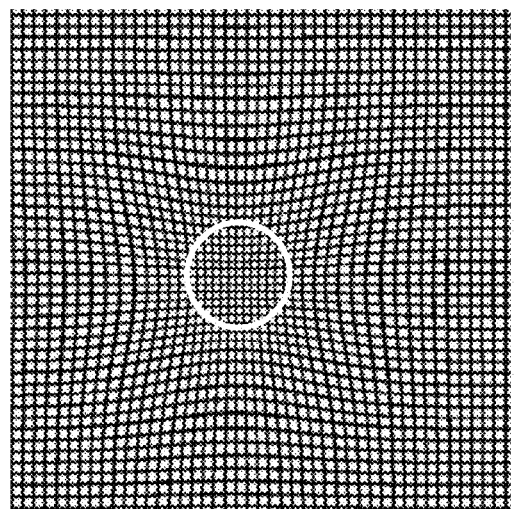
FIG. 2c is an optional example of display pixel density distribution of a display unit after adjustment according to one embodiment of the present application.
Figure 2D:
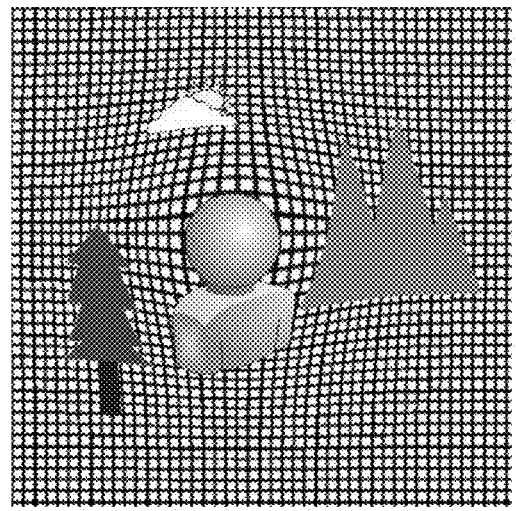
FIG. 2d is an optional example of a display effect according to an image displayed by a display unit after adjustment according to one embodiment of the present application.
Figure 2E:
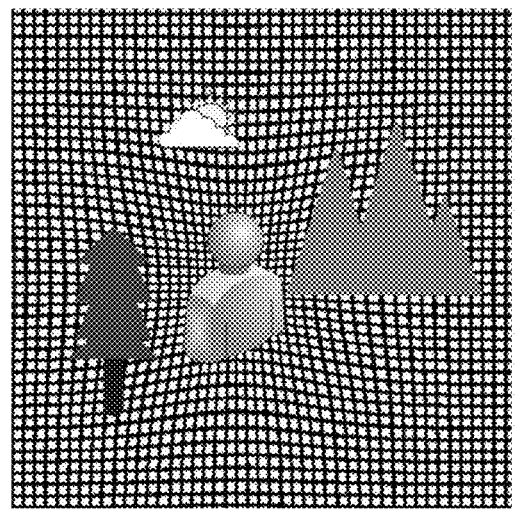
FIG. 2e is an optional example of an improved display effect of an image displayed by an adjusted display unit according to one embodiment of the present application.

After the display pixel density of any display unit is adjusted as uneven distribution, the display pixel density of the display unit presents uneven distribution, as shown in FIG. 2c, display pixel density of a local region (such as a center region) is greater, while display pixel density of another region (such as an edge region) is smaller. According to the image displayed by the adjusted display unit, the display pixel density of different regions (such as human, tree, sun and other different regions) of the image that the display unit is configured to display may vary, and thus definition of different regions of the image actually displayed by the display unit may correspondingly vary. In some scenarios, if influences possibly caused by drive information and other display control factors on the display effect are not taken into account, the image displayed by the adjusted display unit may produce local deformation. For example, suppose that drive information of a certain first image is driven according to index information of display pixels of the display unit, the index information is generally configured to represent serial numbers of the display pixels of the display unit in a display pixel array, for example, a certain display pixel is a display pixel in Line N, Column M, and index information of the display pixels before and after adjustment of the display pixel density is unchanged. If drive information of the first image to be displayed by the adjusted display unit is unchanged and driving is still performed according to the index information of the display pixels of the display unit, a time interval at which two adjacent display pixels of the display unit are driven is unchanged, and when the adjusted display unit is driven to display the first image according to the drive information, a clearer display effect is achieved through deformation display such as an image region (such as a human body part in FIG. 2d) displayed by a region with great display pixel density is amplified. If some situations of actual application, for example, such image deformation effects, are actually desired or the users do not mind the image deformation effects, it is feasible not to adjust the display effect. In order to achieve the display effect of having the same display scales with different regions of the original image but different definition, optionally, it is feasible to first sample a first image to be displayed according to actual position information of display pixels of the adjusted display unit and make pixel distribution of the processed first image correspond to the actual position information of display pixels of the adjusted display unit, in this way, even if drive information of first image information is unchanged, it is also feasible to achieve adjustment on display scales of different regions of the first image actually displayed by adjusting the first image to be displayed, the adjusted display effect is shown in FIG. 2e, display definition of different regions of the first image varies (e.g., in the image, a part of the adjusted display unit for human body display has greater display pixel density, a displayed human body image has higher definition and so on), and sizes, shapes and other display scales of different parts of the image match sizes, shapes and other display scales of corresponding regions of the original image shown in FIG. 2a. Alternatively, it is also feasible to adjust drive information of a first image to be displayed according to actual position information of display pixels of the adjusted display unit, for example, the drive information of the first image is adjusted as to be driven according to actual position information of display pixels; this solution, even if the image is not sampled, can also achieve a similar effect of adjusting display scales of different regions of an actually displayed image by adjusting drive information configured to control the image display.

In other optional implementations, it is also feasible to perform image display control by combining multiple display control methods such as sampling adaptation processing on the image and adaptation adjustment on drive information of the image, to achieve a better image display effect and improve user experience, which is not repeated herein.

In the technical solution provided in the embodiments of the present application, a specific implementation of adjusting display pixel density of the at least one display unit is not limited. For example, the adjusting display pixel density of at least one display unit as uneven distribution comprises: determining a local display region of the at least one display unit as a first display region; and adjusting display pixel density distribution of the at least one display unit, to cause display pixel density distribution of the first display region of the adjusted at least one display unit to be distinguished from other display regions. For a certain display unit to be adjusted, a local region of the display unit can be determined as a first display region according to actual needs, and the first display region is a display region whose display pixels are to be adjusted as denser or sparser, at this point, it is feasible to adjust display pixel density distribution of the display unit, to cause display pixel density of the first display region of the adjusted display unit to be greater than that of other display regions of the display unit, or cause display pixel density of the first display region of the adjusted display unit to be smaller than that of other display regions of the display unit. This solution can adjust a local display region of the display unit as a display region with greater or smaller display pixel density according to actual needs, thus re-adjusting display pixels of the display unit.

The manner of determining the first display region of any display unit to be adjusted is very flexible, for example, the determining a local display region of the at least one display unit as a first display region comprises: determining a local region of at least one of the first images as a first region; and determining a display region, which corresponds to the first region, in the at least one display unit as the first display region. The solution can determine the first display region of the at least one display unit to be adjusted according to the first image to be displayed, which can better meet differential demands of the image display.

Further, in the event that there are multiple display units to be adjusted, it is feasible to respectively determine respective first display regions of the multiple display units to be adjusted according to relevance of first image contents to be displayed by the multiple display units to be adjusted, for example, related parts of the first image contents to be displayed by the multiple display units to be adjusted are respectively determined as first regions of the first images, and then display regions of the multiple display units to be adjusted respectively configured to display the first regions are determined as the first display regions of the multiple display units to be adjusted. It should be noted that, determining that image contents of first regions of different first images are related aims at explaining that respective first regions of the first images have a certain association degree in image contents, the association degree may comprise, but is not limited to, the following situations: different sampled image portions corresponding to a certain region of the same source image, focused image portions in different viewing angles corresponding to the same light field information, portions whose contents present mirror symmetry, the same contents and so on. According to different demands of different images for splicing and/or superimposition display, the first display regions of the multiple display units to be adjusted may be the same or different, the first display regions of the display units configured to display related image contents are all determined, and display pixel density of the first display regions are adjusted to be dense or sparse together. This helps to improve local definition of related contents in spliced and/or superimposed images wholly displayed by the display array and makes full use of the existing display pixels of the display units to improve local image display quality of the actually displayed image.

The manner of acquiring a first region of at least one first image may be determined according to actual needs, and is very flexible.

In one optional implementation, a first region of at least one of the first images may be determined according to ROI information, that is: acquiring ROI information; and determining a local region of at least one of the first images as the first region according to the ROI information. The ROI of a certain first image may comprise, but is not limited to, one or more of the following: at least one region of the first image selected by a user (i.e., a user selection region of the first image), at least one region of the first image gazed by the user (i.e., a user gaze region of the first image), a ROI obtained by automatically detecting the first image by a display control apparatus, and so on. This solution determines a first region of the image according to ROI information, and the determined first region may be a region corresponding to the ROI, or the determined first region may be a region in the image which corresponds to a non-ROI, to cause determination of the first region to better fit with actual user demands, which can better meet users' personalized application demands.

In another optional implementation, the first region of at least one of the first images may be determined according to a result of image analysis, that is, performing image analysis on at least one of the first images; and determining the local region at least one of the first images as the first region according to a result of the image analysis. For example, face recognition is performed on the at least one of the first images to be displayed, and a human face region is determined as the first region of the corresponding first image according to a recognition result. This solution can determine the first region of the corresponding first image according to a result of image analysis on the first image to be displayed, to cause determination of the first region to be more intelligent, thereby improving efficiency and universality of the determination of the first region.

The first region of any one of the first images may comprise one or more first sub-regions. The first sub-regions comprise at least part of regions, whose display definition needs to be relatively increased or decreased, in the first image. In the event that the first region comprises multiple first sub-regions, distribution of the multiple first sub-regions in the first image may be continuous, for example, boundaries of the multiple first sub-regions intersect; or distribution of the multiple first sub-regions in the first image may be discrete, for example, boundaries of the multiple first sub-regions do not intersect, or the boundary of at least one of the multiple first sub-regions does not intersect with boundaries of other first sub-regions. Respective display sub-regions, which are configured to display the determined multiple first sub-regions, in a display unit to be adjusted are determined, the determined respective display sub-regions are the first display region of the display unit, adjusted display pixel density of the multiple first sub-regions comprised in the first display region of a certain display unit may be the same, or display pixel density of at least two of the first sub-regions may vary, display pixel density of a single first sub-region may be evenly distributed or unevenly distributed, and the implementation is very flexible, which are not limited in the embodiments of the present application. This solution improves flexibility of determination of the first region, whose image display definition needs to be adjusted, in the first image, and can better meet users' diversified application demands.

In the event of multiple first images, it is feasible to determine the first regions of the first images respectively, it is also feasible to determine the first regions of part (e.g., one) of the first images and then determine content-related regions in other first images as first regions of the other first images, and the implementation manner is very flexible. Corresponding to the situation where there are multiple display units to be adjusted, different display units can use the same adjustment manner to adjust their respective display pixel density, to cause respective first images displayed by the adjusted display units to be better matched and spliced and/or superimposed and fused; or different display units can use different (e.g., similar or slightly different) adjustment manners to adjust their respective display pixel density, to meet diversified display application demands.

In the embodiments of the present application, the manner of adjusting display pixel density distribution of the display unit may be selected according to actual needs, for example, the adjusting display pixel density distribution of the at least one display unit comprises: determining deformation control information of a controllable deformed material portion of the corresponding display unit according to the first display region of the at least one display unit; and controlling display pixel density distribution of the corresponding display unit according to the deformation control information. This solution adjusts pixel distribution of the display unit by controlling deformation of a controllable deformed material portion, which is simple and easy to implement.

Figure 1B:
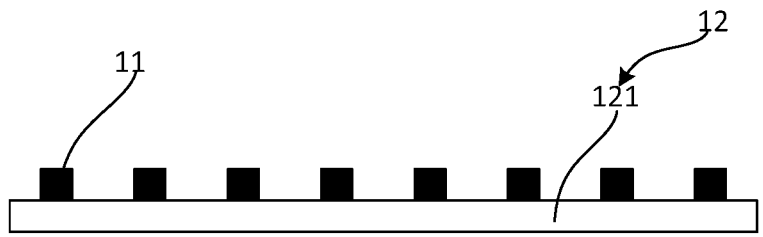
FIG. 1b is a schematic structural diagram of a first display unit with adjustable pixel density according to one embodiment of the present application.

FIG. 1b is a schematic structural diagram of a display unit with adjustable pixel density according to one embodiment of the present application. Optionally, at least one display unit in the display units comprised in the display array is the display unit with adjustable pixel density. As shown in FIG. 1b, the display unit with adjustable pixel density according to the embodiment of the present application comprises: multiple display pixels 11 and a controllable deformed material portion 12, wherein the display unit performs image display through the display pixels 11, the multiple display pixels 11 are array-distributed, and the controllable deformed material portion 12 is connected with the multiple display pixels 11 respectively; the controllable deformed material portion 12 may produce deformation under the action of an external field, and density distribution of the multiple display pixels 11 is correspondingly adjusted through the deformation of the controllable deformed material portion 12. The controllable deformed material portion can produce deformation by changing a certain external effect factor (such as an external field) acting on the controllable deformed material portion, and when the external field acting thereon is cancelled or changed, the deformation of the controllable deformed material portion can be restored.

In the multiple display pixels array-distributed comprised in the display unit with adjustable pixel density provided in the embodiment of the present application, each of the display pixels and the controllable deformed material portion may be closely connected in a manner which comprises, but is not limited to, adhesion, in this way, when the controllable deformed material portion produces deformation, spacing between the display pixels will be adjusted correspondingly, thus changing density distribution of the display pixels and achieving the effect of giving differentiated display pixel density distribution to different regions of the display unit according to actual needs.

During actual applications of the technical solution provided in the embodiments of the present application, an unevenly distributed external field can act on different regions of the controllable deformed material portion, to cause different regions of the controllable deformed material portion to produce deformation differently, thus adjusting the overall density distribution of the display pixels. Optionally, the external field can act on a region where the controllable deformed material portion and the multiple display pixels do not overlap, to cause a region where the controllable deformed material portion and the multiple display pixels overlap not to produce deformation, and the display pixel density distribution is changed through deformation of other parts of the controllable deformed material portion; this solution helps to avoid damage to the display pixels caused by deformation of the controllable deformed material portion.

Further, at least one suitable controllable deformed material can be selected based on actual needs to prepare the controllable deformed material portion, to cause the controllable deformed material portion to have characteristics of being deformable and having recoverable deformation. Optionally, the controllable deformed material portion is at least prepared from at least one or more of the following controllable deformed materials: piezoelectric materials, electroactive polymers, photodeformation materials and magnetostrictive materials.

The piezoelectric materials may produce mechanical deformation due to the action of an electric field. The controllable deformed material portion prepared from the piezoelectric materials is hereinafter referred to as a piezoelectric material portion. By use of such a physical property of the piezoelectric material, the embodiments of the present application can determine desired electric field control information configured to make the piezoelectric material portion produce corresponding mechanical deformation according to, but not limited to, the target pixel density distribution information, control an electric field acting on the piezoelectric material portion according to the electric field control information, to cause the piezoelectric material portion to produce corresponding mechanical deformation, and correspondingly adjust pixel density distribution of the display unit through the mechanical deformation of the piezoelectric material portion, thus achieving the purpose of adjusting display pixel density distribution of the display unit according to the target pixel density distribution information. The piezoelectric materials may comprise, but are not limited to, at least one of the following: piezoelectric ceramic and piezoelectric crystal. This solution can make full use of the physical property of the piezoelectric material to adjust pixel density distribution of the display unit.

The Electroactive Polymers (referred to as EAPs) are one kind of polymer materials that can change their shapes or sizes under the action of an electric field. The controllable deformed material portion prepared from the EAPs is hereinafter referred to as an EAP portion. By use of such a physical property of the EAPs, the embodiments of the present application can determine desired electric field control information configured to make the EAP portion produce corresponding deformation according to, but not limited to, the target pixel density distribution information, control an electric field acting on an EAP layer according to the electric field control information, to cause the EAP layer to produce corresponding deformation, and correspondingly adjust pixel density distribution of the display unit through the deformation of the EAP layer, thus achieving the purpose of adjusting display pixel density distribution of the display unit according to the target pixel density distribution information. The EAP materials may comprise, but are not limited to, at least one of the following: electronic EAPs and ionic EAPs; the electronic EAPs comprise at least one of the following: ferroelectric polymers (such as polyvinylidene fluoride), electrostrictive grafted elastomers and liquid crystal elastomers; and the ionic EAPs comprise at least one of the following: electrorheological fluids, ionic polymer-metallic composite materials and the like. This solution can make full use of the physical property of the EAPs to adjust pixel density distribution of the display unit.

The photodeformation materials are one kind of polymer materials that can change their shapes or sizes under the action of a light field. The controllable deformed material portion prepared from the photodeformation materials is hereinafter referred to as a photodeformation material portion. By use of such a physical property of the photodeformation materials, the embodiment of the present application can determine desired light field control information configured to make the photodeformation material portion produce corresponding deformation according to, but not limited to, the target pixel density distribution information, control a light field acting on the photodeformation material portion according to the light field control information, to cause the photodeformation material portion to produce corresponding deformation, and correspondingly adjust pixel density distribution of the display unit through the deformation of the photodeformation material portion, thus achieving the purpose of adjusting display pixel density distribution of the display unit according to the target pixel density distribution information. The photodeformation materials may comprise, but are not limited to, at least one of the following: photostrictive ferroelectric ceramics and photodeformation polymers; the photostrictive ferroelectric ceramics comprise, but are not limited to, lead lanthanum zirconate titanate (PLZT) ceramics, and the photodeformation polymers comprise, but are not limited to, photodeformation liquid crystal elastomers. This solution can make full use of the physical property of the photodeformation material to adjust pixel density distribution of the display unit.

The magnetostrictive materials are one kind of magnetic materials that can change a magnetization state thereof under the action of a magnetic field and then change their sizes. The controllable deformed material portion prepared from the magnetostrictive material is hereinafter referred to as a magnetostrictive material portion. By use of such a physical property of the magnetostrictive materials, the embodiment of the present application can determine desired magnetic field control information configured to make the magnetostrictive material produce corresponding deformation according to, but not limited to, the target pixel density distribution information, control a magnetic field acting on the magnetostrictive material portion according to the magnetic field control information, to cause the magnetostrictive material portion to produce corresponding deformation, and correspondingly adjust pixel density distribution of the display unit through the deformation of the magnetostrictive material portion, thus achieving the purpose of adjusting display pixel density distribution of the display unit according to the target pixel density distribution information. The magnetostrictive materials may comprise, but are not limited to, rare-earth giant magnetostrictive materials, such as alloy $Tbo_{0.3}Dy_{0.7}Fe_{1.95}$ materials using a $(Tb,Dy)Fe_2$ compound as a substrate. This solution can make full use of the physical property of the magnetostrictive material to adjust pixel density distribution of the display unit.

In the technical solution provided in the embodiment of the present application, specific structures and connecting modes of the display pixels and the controllable deformed material portion can be determined according to actual needs, and the actual modes are very flexible.

In one optional implementation, as shown in FIG. 1b, the controllable deformed material portion 12 comprises: a controllable deformed material layer 121, the multiple display pixels 11 being array-distributed and connected to one side of the controllable deformed material layer 121. Optionally, it is feasible to choose to directly form the multiple display pixels on the controllable deformed material portion 12 according to actual process conditions, or the multiple display pixels and the controllable deformed material portion 12 can be prepared respectively and can be closely connected in a manner which comprises, but is not limited to, adhesion. This solution has a simple structure and is easy to implement.

Figure 1C:
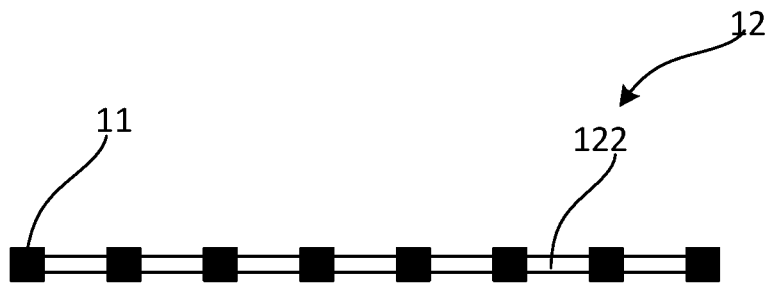
FIG. 1c is a schematic structural diagram of a second display unit with adjustable pixel density according to one embodiment of the present application.

In another optional implementation, as shown in FIG. 1c, the controllable deformed material portion 12 comprises multiple controllable deformed material connecting sub-portions 122, the multiple controllable deformed material connecting sub-portions 122 being array-distributed, so as to correspondingly connect the multiple display pixels 11 that are array-distributed, that is, the multiple display pixels array-distributed are connected into one piece through the multiple controllable deformed material connecting sub-portions array-distributed. Optionally, the multiple controllable deformed material connecting sub-portions can be formed in spacing regions of pixels of a display pixel array according to an actual process, and the multiple controllable deformed material connecting sub-portions and the corresponding display pixels may be connected in a manner which comprises, but is not limited to, abutment and adhesion. The density distribution of the display pixels can be adjusted by controlling deformation of the multiple controllable deformed material connecting sub-portions; the structure is simple and is easy to implement.

Figure 1D:
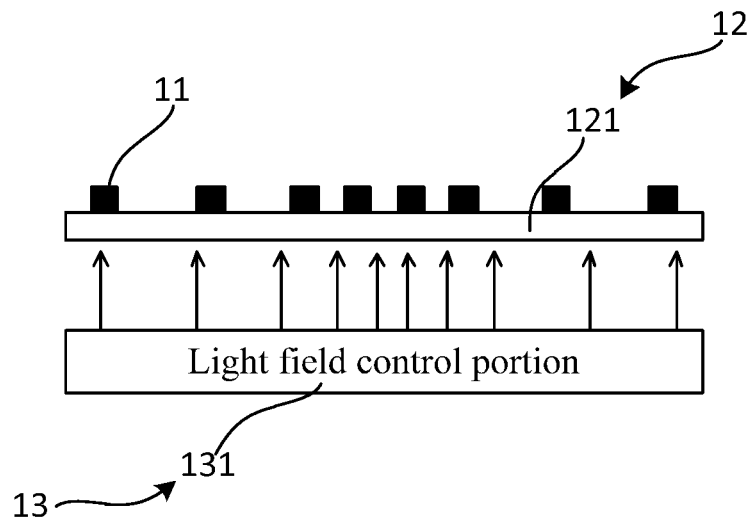
FIG. 1d is a schematic structural diagram of a third display unit with adjustable pixel density according to one embodiment of the present application.
Figure 1E:
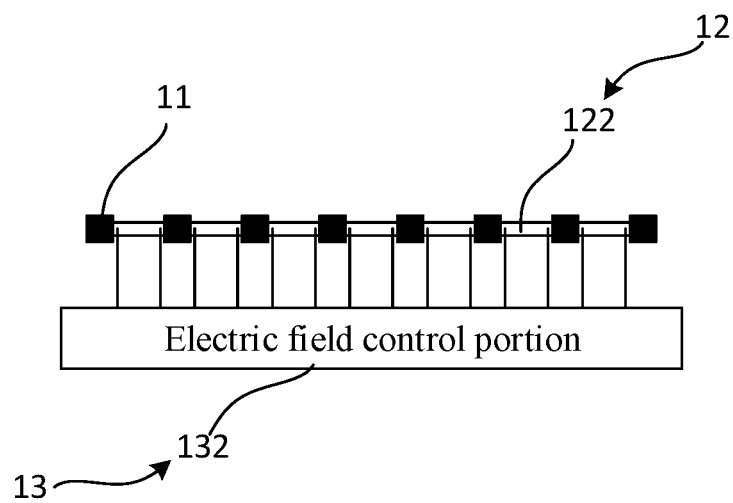
FIG. 1e is a schematic structural diagram of a fourth display unit with adjustable pixel density according to one embodiment of the present application.

Further, as shown in FIG. 1d and FIG. 1e, the display unit may further comprise: a deformation control portion 13, wherein the deformation control portion 13 is configured to adjust distribution of the external field acting on the controllable deformed material portion 12, so as to control the controllable deformed material portion 12 to produce corresponding deformation, in this way, when the controllable deformed material portion 12 produces deformation, the spacing between the display pixels 11 may be adjusted correspondingly, thus changing density distribution of the display pixels 11 and achieving the effect of giving differential display pixel density distribution to different regions of the display unit according to actual needs.

Optionally, as shown in FIG. 1d, the deformation control portion may comprise a light field control portion 131, wherein the light field control portion 131 is configured to adjust distribution of an external light field acting on the controllable deformed material portion 12, so as to control the controllable deformed material portion 12 to produce corresponding deformation. In this case, the controllable deformed material portion 12 may comprise a photodeformation material portion at least prepared from photodeformation materials, for example, the photodeformation material portion may comprise a photodeformation material layer at least prepared from the photodeformation materials, or the controllable deformed material portion may comprise multiple photodeformation material connecting sub-portions at least prepared from the photodeformation materials. The light field control portion 131 excites different regions of the controllable deformed material portion 12 to produce deformation differently by changing light field distribution acting on the photodeformation material portion (in FIG. 1d, the light field with different intensity distribution acting on the controllable deformed material portion 12 is represented through arrow density), and the spacing between the display pixels 11 is adjusted correspondingly through the deformation of the controllable deformed material portion 12, thus changing density distribution of the display pixels 11 and achieving the effect of giving differential display pixel density distribution to different regions of the display unit according to actual needs.

Figure 1F:
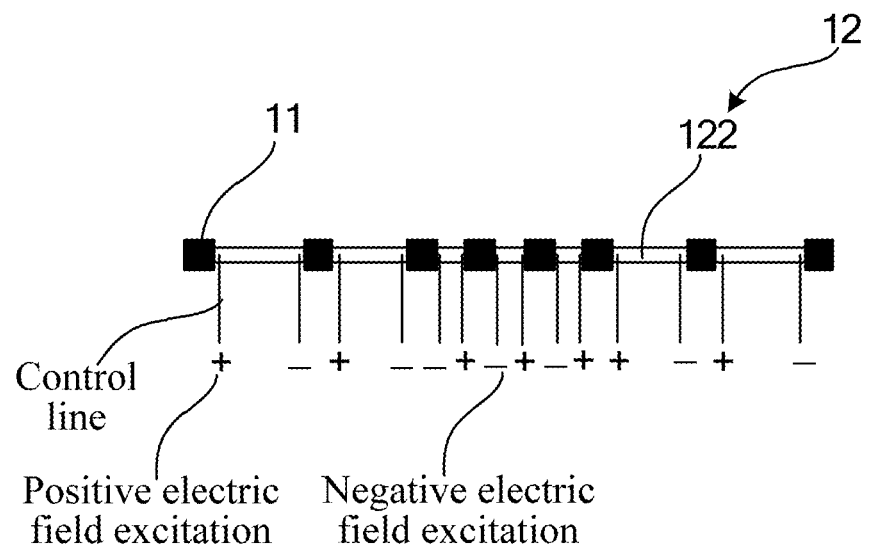
FIG. 1f is an example of a scene where a display unit performs pixel density adjustment in the event of uneven light field excitation according to one embodiment of the present application.

Optionally, as shown in FIG. 1e, the deformation control portion may comprise an electric field control portion 132, wherein the electric field control portion 132 is configured to adjust distribution of an external electric field acting on the controllable deformed material portion, so as to control the controllable deformed material portion to produce corresponding deformation. In this case, the controllable deformed material portion 12 may comprise a piezoelectric material portion at least prepared from piezoelectric materials (such as a piezoelectric material layer or a piezoelectric material connecting sub-portion), or the controllable deformed material portion 12 may comprise an EAP portion at least prepared from EAPs (such as an EAP layer or an EAP connecting sub-portion). As shown in FIG. 1e, the electric field control portion and the controllable deformed material can be connected through a control line, and the electric field control portion 132 excites different regions of the controllable deformed material portion 12 to produce deformation differently by changing electric field distribution acting on the controllable deformed material portion. If the electric field acting on the controllable deformed material portion 12 is a zero field, the controllable deformed material portion does not produce deformation (might as well be called zero field excitation); if intensity distribution of the electric field acting on the controllable deformed material portion 12 (for example, "+" positive electric field excitation and "−" negative electric field excitation shown in FIG. 1e) is changed to cause the intensity of the electric field acting on different regions of the controllable deformed material portion 12 to vary, as shown in FIG. 1f, in this way, the different regions of the controllable deformed material portion may produce deformation differently, and the spacing between the display pixels 11 is adjusted correspondingly through the deformation of the controllable deformed material portion 12, thus changing the overall pixel density distribution of the display unit and achieving the effect of giving differential display pixel density distribution to different regions of the display unit according to actual needs.

In the embodiment of the present application, the controllable deformed portion and the deformation control portion may be directly or indirectly connected. The deformation control portion may serve as a part of the display unit, or the deformation control portion may not serve as a part of the display unit, and the display unit may also be connected with the deformation control portion through a reserved pin or interface or the like. The external field acting on the controllable deformed material portion may comprise, but is not limited to, an electric field, a magnetic field, a light field and the like. A hardware or software structure configured to produce the electric field, a hardware or software structure configured to produce the magnetic field, or a hardware or software structure configured to produce the light field and the like can be achieved by using corresponding existing technologies according to actual needs, which is not repeated herein in the embodiments of the present application.

Figure 1G:
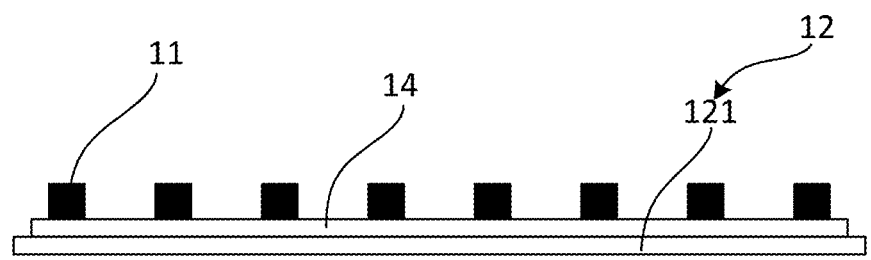
FIG. 1g is a schematic structural diagram of a fifth display unit with adjustable pixel density according to one embodiment of the present application.
Figure 1H:
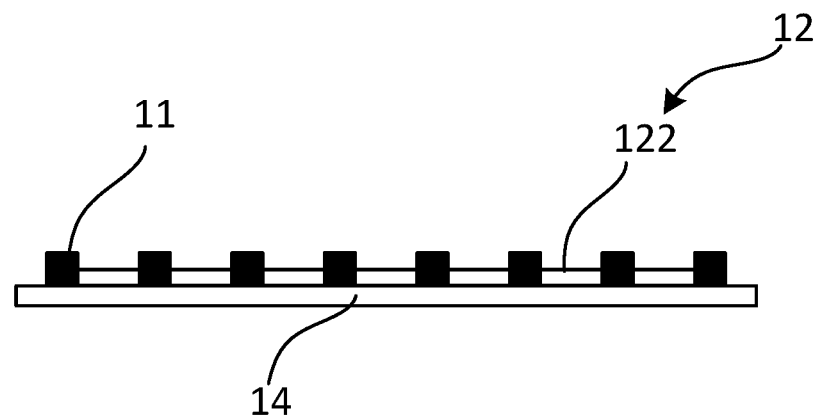
FIG. 1h is a schematic structural diagram of a sixth display unit with adjustable pixel density according to one embodiment of the present application.

Optionally, the display unit may further comprise a flexible substrate, and the flexible substrate may comprise, but is not limited to, a flexible plastic substrate, which has certain flexibility and can change the shape of the flexible substrate according to needs. The display pixels and the controllable deformed material portion may be disposed on the same side or different sides of the flexible substrate. For example, as shown in FIG. 1g, the multiple display pixels 11 are connected to one side of the flexible substrate 14, and the controllable deformed material portion (for example, the controllable deformed material layer 121) is connected to the other side of the flexible substrate 14. For another example, as shown in FIG. 1h, the multiple display pixels 11 are connected to one side of the flexible substrate 14, and the controllable deformed material portion (for example, the controllable deformed material connecting sub-portion 122) is connected to the corresponding display pixel and is located on the same side of the flexible substrate 14 as the display pixel 11. This solution not only can indirectly adjust the overall pixel density distribution of the display unit by controlling its deformation through the external field acting on the controllable deformed material portion, to achieve adjustable pixel density of the display unit, but also can flexibly change the shape of the display unit through use of the flexible substrate, for example, a plane display unit is bent to a certain angle to obtain a curved surface display unit, thus meeting diversified application demands regarding image display and decoration.

Figure 1I:
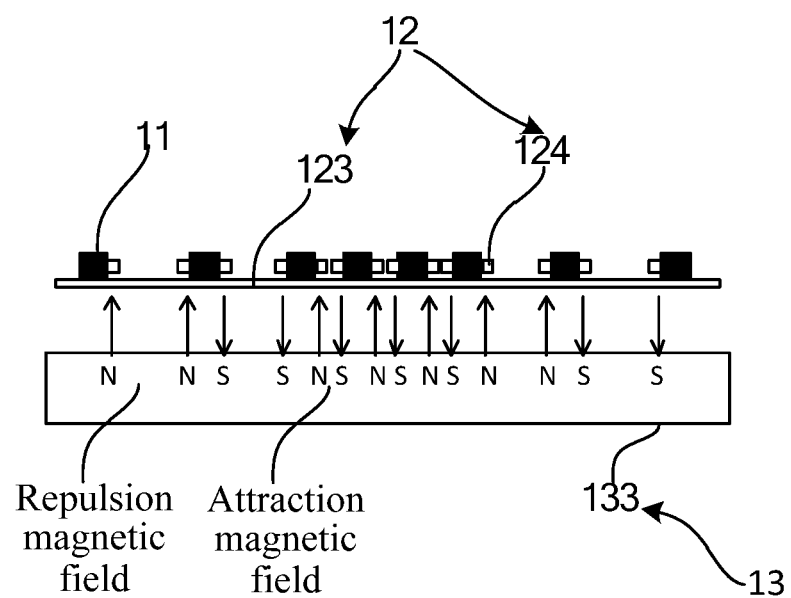
FIG. 1i is a schematic structural diagram of a seventh display unit with adjustable pixel density according to one embodiment of the present application.

FIG. 1i is a schematic structural diagram of a seventh display unit with adjustable pixel density according to one embodiment of the present application. In the display unit as shown in FIG. 1i, the controllable deformed material portion 12 comprises: a flexible substrate 123 and multiple permeability magnetic material portions 124; the multiple display pixels 11 are respectively connected with the flexible substrate 123, at least a part of the display pixels 11 are connected with the multiple permeability magnetic material portions 124, the flexible substrate 123 produces corresponding deformation by changing a magnetic field acting on the permeability magnetic material portions 124, and density distribution of the multiple display pixels 11 is correspondingly adjusted through the deformation. For example, a permeability magnetic material portion 124 can be disposed on a side face of each display pixel, and optionally, the display pixel 11 is respectively adhered to the flexible substrate 123 and the permeability magnetic material portion 124. The permeability magnetic material portion may comprise a magnetic pole prepared from a permeability magnetic material, and the permeability magnetic material may comprise, but is not limited to, one or more of a soft magnetic material, a silicon steel sheet, a permalloy, ferrite, an amorphous soft magnetic alloy, and a super-microcrystalline soft magnetic alloy. The permeability magnetic material portion prepared from the soft magnetic material has better permeability, and small residual magnetization after cancellation of the magnetic field, which facilitates next adjustment.

Further, optionally, the deformation control portion 13 in the embodiment of the present application may further comprise: a magnetic field control portion 133, wherein the magnetic field control portion 133 is configured to adjust distribution of an external magnetic field acting on the controllable deformed material portion, so as to control the controllable deformed material portion to produce corresponding deformation. For example, when the magnetic field control portion 133 controls the magnetic field (that is, excitation magnetic field) acting on the permeability magnetic material portion 124, as shown in FIG. 1i, a like magnetic pole (NN or SS) repulsion magnetic field or an unlike magnetic pole (NS or SN) attraction magnetic field with certain magnetic field intensity distribution is applied between adjacent display pixels, the poles may produce a corresponding repelling force or attracting force therebetween, the magnetic force is transferred to the flexible substrate 123 to make the flexible substrate 123 produce deformation such as expansion and contraction, thereby resulting in that the spacing between the corresponding display pixels changes and achieving the purpose of adjusting display pixel density distribution. This solution achieves adjustable pixel density distribution of the display unit in combination with scalable deformation characteristics of the flexible substrate and the magnetic field control principle.

Figure 1J:
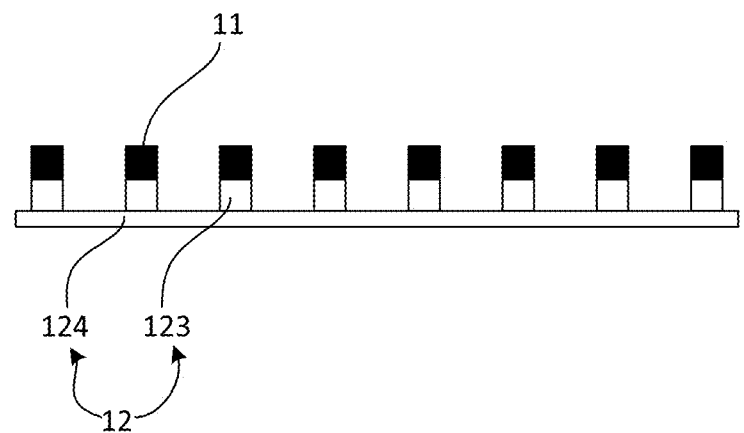
FIG. 1j is a schematic structural diagram of an eighth display unit with adjustable pixel density according to one embodiment of the present application.

FIG. 1j is a schematic structural diagram of an eighth display unit with adjustable pixel density according to one embodiment of the present application. In the display as shown in FIG. 1j, the controllable deformed material portion 12 comprises: a flexible substrate 123 and multiple permeability magnetic material portions 124; one side of the multiple permeability magnetic material portions 124 is respectively connected with the flexible substrate 123, an opposite face of the multiple permeability magnetic material portions 124 is respectively connected with the multiple display pixels 11 correspondingly, the flexible substrate 123 produces corresponding deformation by changing a magnetic field acting on the permeability magnetic material portions 124, and density distribution of the multiple display pixels 11 is correspondingly adjusted through the deformation. Optionally, the permeability magnetic material portions 124 are adhered to the flexible substrate 123, the display pixels 11 are adhered to the permeability magnetic material portions 124, and when the magnetic field acting on the permeability magnetic material portions 124 changes, the magnetic force is transferred to the flexible substrate 123 to make the flexible substrate 123 produce deformation such as expansion and contraction, thereby achieving the purpose of adjusting display pixel density distribution. This solution achieves adjustable pixel density distribution of the display unit in combination with scalable deformation characteristics of the flexible substrate and the magnetic field control principle.

On the basis of a technical solution provided in the embodiment of the present application, the display control method may further comprise: acquiring the multiple first images which are content-related but at least partially different. The acquired multiple first images are displayed via multiple display units of at least one adjusted display unit comprised in the display array respectively, the first images displayed are spliced and/or superimposed in a display space, and definition of the second image wholly displayed can be presented differently by making full use of the display pixels of the display units.

The manner of acquiring the multiple first images which are content-related but at least partially different is very flexible, which is not limited in the embodiments of the present application.

Figure 3:
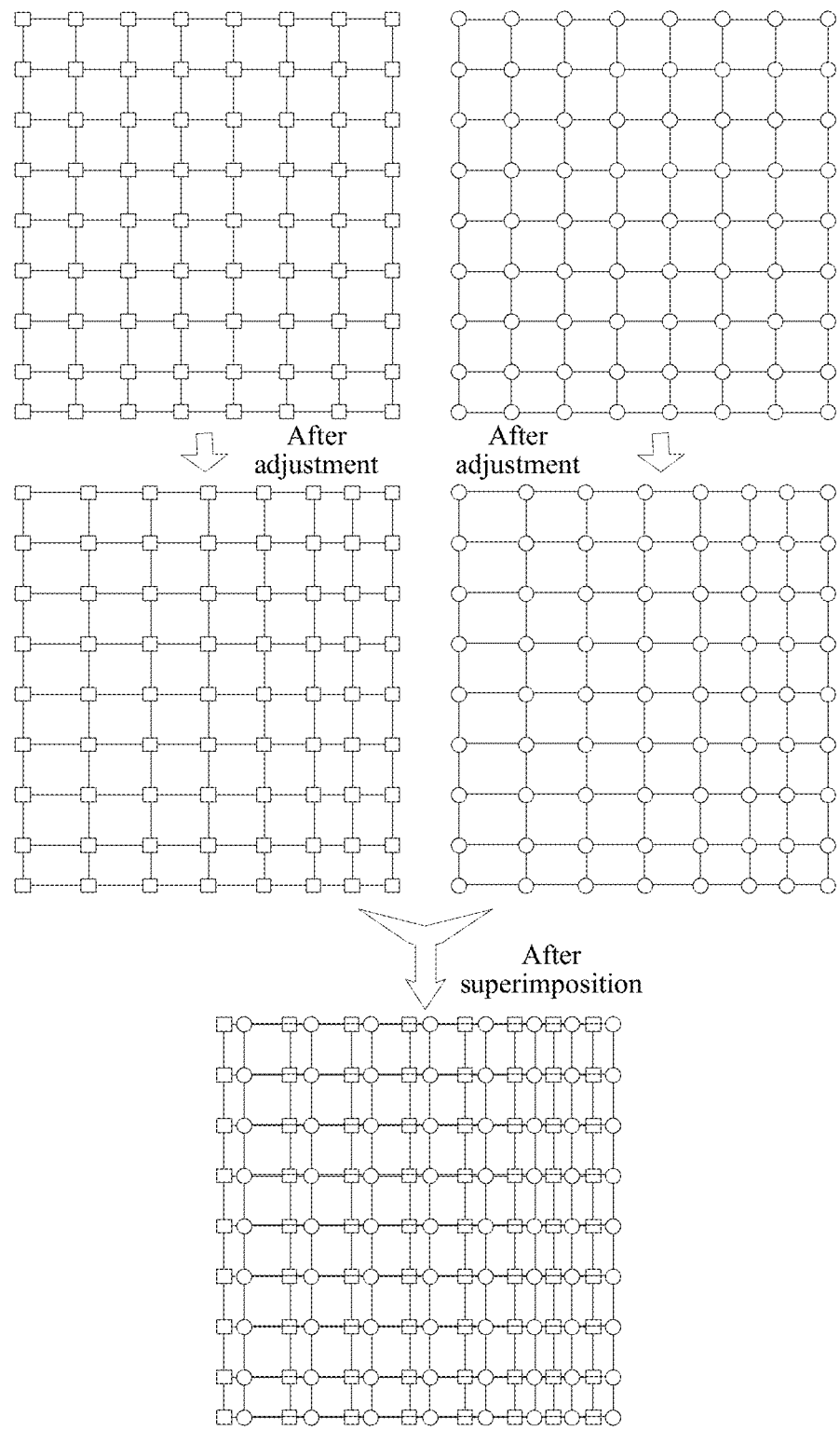
FIG. 3 is an optional example of an application scene of image superimposition display control according to one embodiment of the present application.

For example, the acquiring the multiple first images which are content-related but at least partially different comprises: sampling a collected high resolution source image in different manners, the sampling manner may comprise, but is not limited to, different spatial resolution sampling and/or different angular resolution sampling on a source light field image, that is, it is feasible to perform different spatial resolution sampling and/or different angular resolution sampling on a source light field image corresponding to the light field information, to acquire multiple focused images in different viewing angles respectively corresponding to the source light field image. Optionally, as shown in FIG. 3, odd index pixels of the source image are sampled to obtain one first image, even index pixels of the source image are sampled to obtain another first image, the two first images are respectively displayed via display units whose display pixel density is adjusted as uneven distribution, display resolution of the displayed two first images also presents uneven distribution, the two first images displayed after the display unit is adjusted are superimposed in a display space to obtain a second image, and image resolution of displayed contents of display regions, which have greater display pixel density, of the display unit obtains greater gain.

For another example, the acquiring the multiple first images which are content-related but at least partially different comprises: acquiring multiple focused images in different viewing angles respectively corresponding to light field information.

The light field display technology may be applied to, but is not limited to, glasses-free 3D (pseudo holographic) display, and its display principle is based on restoring light field information of a display scene (e.g., light distribution information of the display scene), to enable the user to view displayed contents in the most natural glasses-free manner, which is like watching scenery through a window in effect. However, the cost of achieving the flexible display characteristics is sacrificing display resolution, that is to say, based on the same display pixel condition, spatial resolution of an image displayed with the light field display technology is lower than spatial resolution of the traditional image, and the issue of image display resolution is particularly prominent in the light field display technology, which becomes a difficulty demanding prompt solution for its popularization and application.

Figure 4:
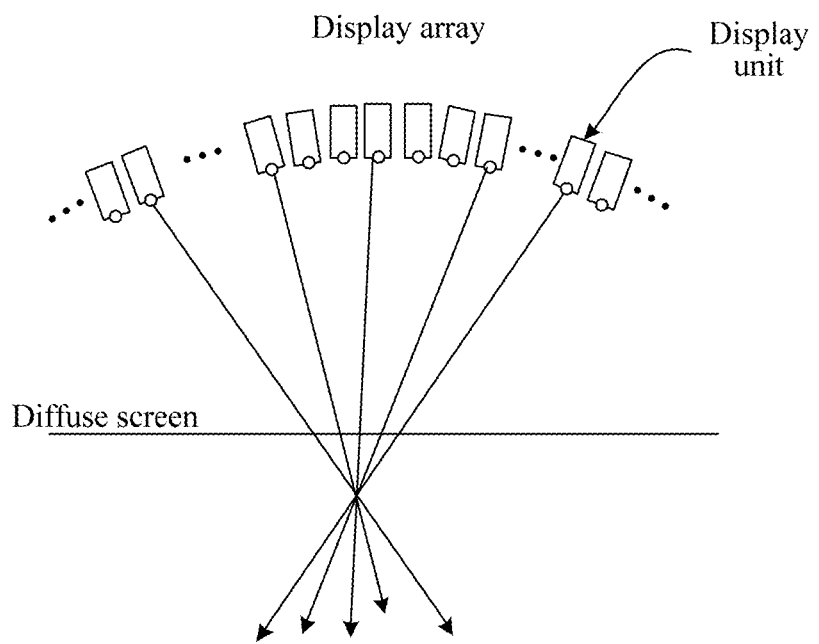
FIG. 4 is an optional structure example of a display array according to one embodiment of the present application.

In actual applications, a light field camera may collect a high-dimensional source light field image through an image sensor, and the collection manner may comprise, but is not limited to, spatial multiplex collection based on a single image sensor, or collection based on an image sensor array. Based on the collected high-dimensional source light field image, it is feasible to acquire multiple focused images in different viewing angles corresponding to the high-dimensional source light field image, one focused image being one 2D image. Optionally, it is feasible to increase image display resolution in a manner of performing superimposition display on focused images in different viewing angles in a display space by using a display array. For example, one optional structure of the display array that can be configured to perform light field display is as shown in FIG. 4, comprising multiple display units sequentially arranged along a curve with certain curvature, one display unit displays a focused image (2D image) of a viewing angle of certain light field information, and different display units display focused images in different viewing angles, in this way, focused images of viewing angles displayed by the display units respectively are superimposed and displayed in the display space, which can restore light field information to some extent and achieve a display effect that the user can see a superimposed 3D image without glasses. The manner of acquiring multiple focused images in different viewing angles respectively corresponding to light field information is very flexible. For example, it is feasible to, based on a source light field image collected, acquire focused images (refocused images) corresponding to different viewing angles based on the source light field image, and the acquired refocused images are superimposed in the display space after being displayed by the display array respectively. For another example, it is feasible to, based on a 3D source image of a certain scene generated by a computer, acquire multiple clear 2D images of the scene in different viewing angles in a manner such as software simulation, and the multiple clear 2D images in different viewing angles are superimposed in the display space after being displayed by the display array respectively. Multiple focused images in different viewing angles respectively corresponding to light field information are displayed respectively via multiple display units of the display array, focused images of the viewing angles displayed are superimposed in the display space, display resolution of the obtained actual image is improved relative to resolution of a focused image of a single viewing angle, viewing angle, light and other information of an image displayed by a display region with greater display pixel density are richer, and corresponding local image display quality is also correspondingly enhanced, for example, spatial resolution of local images of a certain or some viewing angles superimposed and displayed is enhanced, thus increasing the actual utilization rate of display pixels of the display units in the light field display process, which can partially improve problems such as low local display resolution of images of a certain or some viewing angles of the light field display image.

It should be understood by those skilled in the art that, in any one of the foregoing methods of the specific implementations of the present application, the value of the serial number of each step described above does not mean an execution sequence, and the execution sequence of each step should be determined according to the function and internal logic thereof, and should not be any limitation to the implementation procedure of the specific implementations of the present application.

Figure 5:
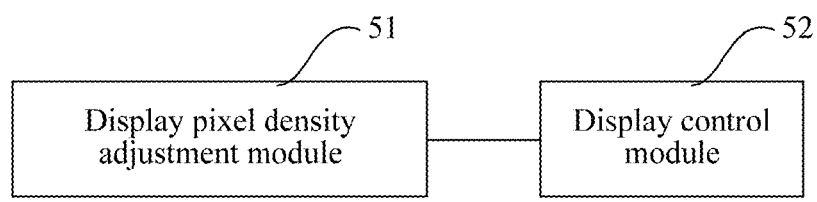
FIG. 5 is a logic block diagram of one display control apparatus according to one embodiment of the present application.

FIG. 5 is a logic block diagram of a display control apparatus according to one embodiment of the present application. As shown in FIG. 5, the display control apparatus according to the embodiment of the present application comprises: a display pixel density adjustment module 51 and a display control module 52.

The display pixel density adjustment module 51 is configured to adjust display pixel density of at least one display unit in a display array as uneven distribution.

The display control module 52 is configured to display multiple first images respectively via multiple display units in the adjusted display array, to splice and/or superimpose the multiple first images to be displayed as a second image, the multiple display units comprising the at least one display unit.

The technical solution provided in the embodiment of the present application can make full use of overall pixels of at least one display unit in a display array to present differentiated display definition of different regions of a first image, equivalent to correspondingly adjusting existing display pixel density distribution of the at least one display unit to achieve an effect of giving different display pixel density to different display regions of the at least one display unit for image display, to cause definition of different regions of an image displayed by the at least one display unit to vary. In this way, when multiple display units display first images respectively, definition of a second image obtained by splicing and/or superimposing the first images whose definition is displayed differently, or by splicing and/or superimposing the first images whose definition is displayed differently and other first images also presents corresponding uneven distribution, for example, a local part of the second image is much clearer than other parts and the like. This helps to, on the basis of giving full play to advantages such as resolution gain and wide viewing angle of image display performed by the display array, further achieve matching between display resolution of a local part of an actual displayed image and high collection resolution of the image based on the display array, thus increasing an actual utilization rate of display pixels of the display array, increasing local display quality of the splicing and/or the image, and satisfying users' differentiated display demands for the local part of the image.

The display control apparatus can perform image display control by executing the display control method during applications, which comprise, but are not limited to, image display and video playback. Device manifestations of the display control apparatus are not limited, for example, the display control apparatus may be a certain separate component, and the component cooperates with the display device array for communications; or the display control apparatus may be integrated, as a certain functional module, into a display device comprising a display array, which is not limited in the embodiments of the present application.

Figure 6:
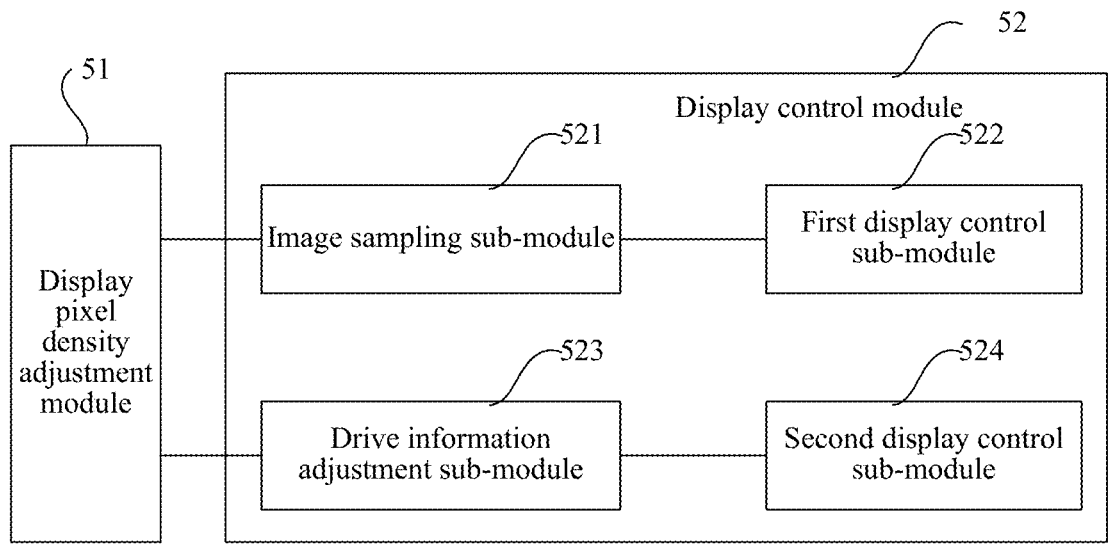
FIG. 6 is a logic block diagram of another display control apparatus according to one embodiment of the present application.

Optionally, as shown in FIG. 6, the display control module 52 comprises: an image sampling sub-module 521 and a first display control sub-module 522. The image sampling sub-module 521 is configured to sample a first image to be displayed by the at least one display unit according to actual position information of display pixels in the adjusted at least one display unit; and the first display control sub-module 522 is configured to display multiple first images respectively via multiple display units in the adjusted display array, wherein the adjusted at least one display unit displays the sampled first image. This solution can determine, according to actual needs, whether it is necessary to perform sampling adaptation processing on a first image to be displayed by the display unit according to actual spatial positions of display pixels of the adjusted display units. If necessary, it is feasible to sample the first image to be displayed by the display unit according to actual position information of display pixels in the adjusted at least one display unit, to cause certain display effects on the basis that display definition of different regions of the first image varies, such as sizes, shapes and other display scales of different regions of the first image actually displayed by the adjusted display unit match sizes, shapes and other display scales of corresponding regions of the first image before processing. This facilitates images displayed by the adjusted display unit to be correspondingly spliced and/or superimposed with images displayed by other display units in the display array in a display space, increases local definition of the second image after splicing and/or superimposition, and better meets users' diversified application demands.

Optionally, the display control module 52 comprises: a drive information adjustment sub-module 523 and a second display control sub-module 524. The drive information adjustment sub-module 523 is configured to adjust drive information of a first image to be displayed by the at least one display unit according to actual position information of display pixels in the adjusted at least one display unit; and the second display control sub-module 524 is configured to display multiple first images respectively via multiple display units in the adjusted display array, wherein the adjusted at least one display unit is controlled to display the corresponding first image according to the adjusted drive information. This solution can determine, according to actual needs, whether it is necessary to perform drive adaptation adjustment on a scan drive manner of the display unit according to actual spatial positions of display pixels of the adjusted display units. If necessary, it is feasible to perform drive adaptation adjustment on the scan drive manner of the display unit according to actual spatial positions of display pixels of the adjusted display units, to cause certain display effects on the basis that display definition of different regions of the first image varies, such as display scales of different regions of the first image actually displayed by the adjusted display unit match actual scales of corresponding regions of the first image. This facilitates images displayed by the adjusted display unit to be correspondingly spliced and/or superimposed with images displayed by other display units in the display array in a display space, increases local definition of the second image after splicing and/or superimposition, and better meets users' diversified application demands.

Figure 7:
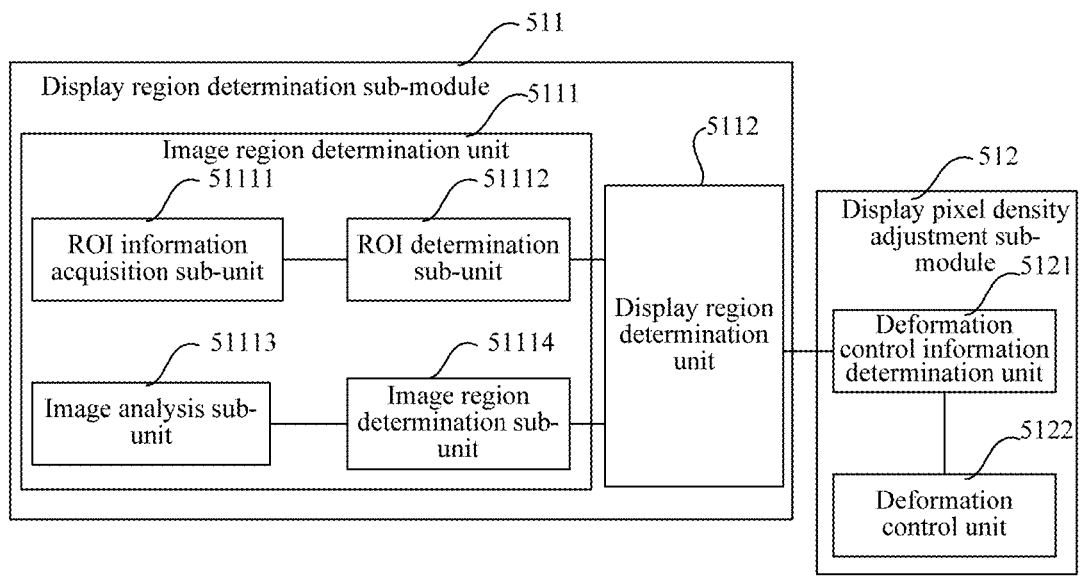
FIG. 7 is a logic block diagram of a display pixel density adjustment module according to one embodiment of the present application.

Optionally, as shown in FIG. 7, the display pixel density adjustment module 51 comprises: a display region determination sub-module 511 and a display pixel density adjustment sub-module 512. The display region determination sub-module 511 is configured to determine a local display region of the at least one display unit as a first display region; and the display pixel density adjustment sub-module 512 is configured to adjust display pixel density distribution of the at least one display unit, to cause display pixel density distribution of the first display region of the adjusted at least one display unit to be distinguished from other display regions. This solution can adjust a local display region of the display unit as a display region with greater or smaller display pixel density according to actual needs, thus re-adjusting display pixels of the display unit.

Optionally, the display pixel density adjustment module 51 comprises: an image region determination unit 5111 and a display region determination unit 5112. The image region determination unit 5111 is configured to determine a local region of at least one of the first images as a first region; and the display region determination unit 5112 is configured to determine a display region, which corresponds to the first region, in the at least one display unit as the first display region. This solution can determine the first display region of the at least one display unit to be adjusted according to the first image to be displayed, which can better meet differential demands of the image display.

Optionally, image contents of first regions of different first images are related. This solution helps to improve local definition of related contents in spliced and/or superimposed images wholly displayed by the display array and makes full use of the existing display pixels of the display units to improve local image display quality of the actually displayed image.

Optionally, the image region determination unit 5111 comprises: a ROI information acquisition sub-unit 51111 and a ROI determination sub-unit 51112. The ROI information acquisition sub-unit 51111 is configured to acquire ROI information; and the ROI determination sub-unit 51112 is configured to determine the local region of at least one of the first images as the first region according to the ROI information. This solution determines a first region of the image according to ROI information, and the determined first region may be a region corresponding to the ROI, or the determined first region may be a region corresponding to a non-ROI, to cause determination of the first region to better fit with actual user demands, which can better meet users' personalized application demands.

Optionally, the image region determination unit 5111 comprises: an image analysis sub-unit 51113 and an image region determination sub-unit 51114. The image analysis sub-unit 51113 is configured to perform image analysis on at least one of the first images; and the image region determination sub-unit 51114 is configured to determine a local region of at least one of the first images as the first region according to a result of the image analysis. This solution can determine the first region of the corresponding first image according to a result of image analysis on the first image to be displayed, to cause determination of the first region to be more intelligent, thereby improving efficiency and universality of the determination of the first region.

Optionally, the display pixel density adjustment sub-module 512 comprises: a deformation control information determination unit 5121 and a deformation control unit 5122. The deformation control information determination unit 5121 is configured to determine deformation control information of a controllable deformed material portion of the corresponding display unit according to the first display region of the at least one display unit; and the deformation control unit 5122 is configured to control display pixel density distribution of the corresponding display unit according to the deformation control information. Optionally, the controllable deformed material portion is at least prepared from at least one or more of the following controllable deformed materials: piezoelectric materials, electroactive polymers, photodeformation materials and magnetostrictive materials. This solution adjusts pixel distribution of the display unit by controlling deformation of a controllable deformed material portion, which is simple and easy to implement.

Figure 8:
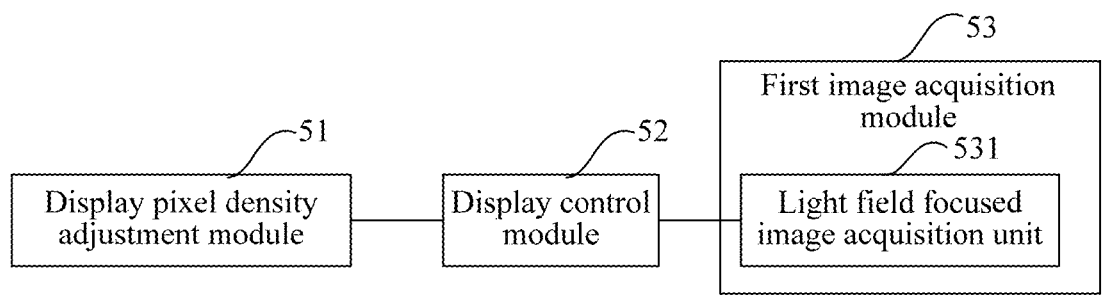
FIG. 8 is a logic block diagram of a further display control apparatus according to one embodiment of the present application.

Optionally, as shown in FIG. 8, the display control apparatus further comprises: a first image acquisition module 53. The first image acquisition module 53 is configured to acquire the multiple first images which are content-related but at least partially different. This solution can make full use of the display pixels of the display units to differently present definition of the second image wholly displayed.

Optionally, the first image acquisition module 53 comprises: a light field focused image acquisition unit 531. The light field focused image acquisition unit 531 is configured to acquire multiple focused images in different viewing angles respectively corresponding to light field information. For example, the light field focused image acquisition unit performs different spatial resolution sampling and/or different angular resolution sampling on a source light field image corresponding to the light field information, to acquire multiple focused images in different viewing angles respectively corresponding to the source light field image. This solution can cause spatial resolution of local images of a certain or some viewing angles superimposed and displayed to be enhanced, thus increasing the actual utilization rate of display pixels of the display units in the light field display process, which can partially solve problems such as low local display resolution of images of a certain or some viewing angles of the light field display image.

Figure 9:
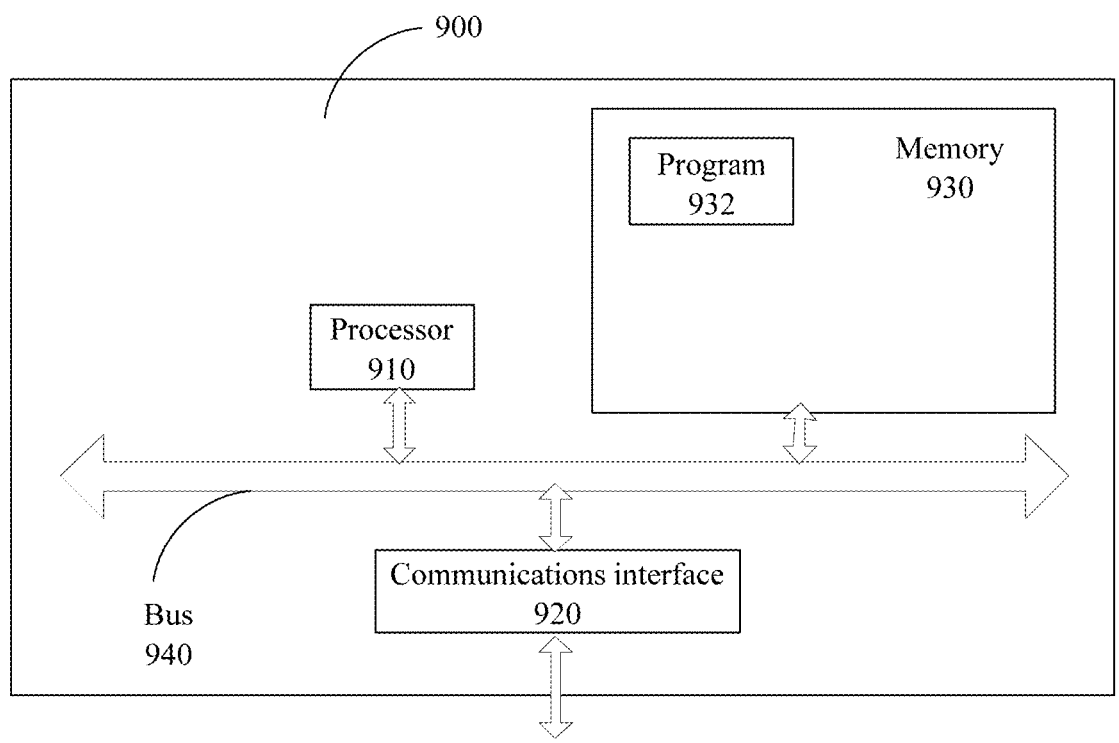
FIG. 9 is a logic block diagram of a yet another display control apparatus according to one embodiment of the present application.

FIG. 9 is a logic block diagram of another display control apparatus according to one embodiment of the present application; the specific embodiment of the present application does not limit specific implementations of the display control apparatus 900. As shown in FIG. 9, the display control apparatus 900 may comprise:

a processor 910, a Communications Interface 920, a memory 930, and a communications bus 940.

The processor 910, the Communications Interface 920, and the memory 930 accomplish mutual communications via the communications bus 940.

The Communications Interface 920 is configured to communicate with, for example, devices or display arrays with a communications function.

The processor 910 is configured to execute a program 932, and specifically, can implement relevant steps in any embodiment of the light field collection control method.

For example, the program 932 may comprise program codes, the program code comprising computer operation instructions.

The processor 910 may be a central processing unit (CPU), or an application specific integrated circuit (ASIC), or be configured to be one or more integrated circuits which implement the embodiments of the present application.

The memory 930 is configured to store the program 932. The memory 930 may comprise a high-speed Random Access Memory (RAM) memory, and may also comprise a non-volatile memory, for example, at least one magnetic disk memory.

For example, in one optional implementation, the processor 910 may perform the following steps by executing the program 932: adjusting display pixel density of at least one display unit in a display array as uneven distribution; and displaying multiple first images respectively via multiple display units in the adjusted display array, to splice and/or superimpose the multiple first images to be displayed as a second image, the multiple display units comprising the at least one display unit.

In other optional implementations, the processor 910 may further perform the steps mentioned in any one of the other embodiments by executing the program 932, which is not repeated herein.

Reference can be made to corresponding description in the corresponding steps, modules, sub-modules and units in the embodiments for specific implementation of the steps in the program 932, which is not repeated herein. Those skilled in the art can clearly understand that, reference can be made to the corresponding process description in the method embodiments for the specific working procedures of the devices and the modules described above, and will not be repeated herein in order to make the description clear and concise.

Figure 10:
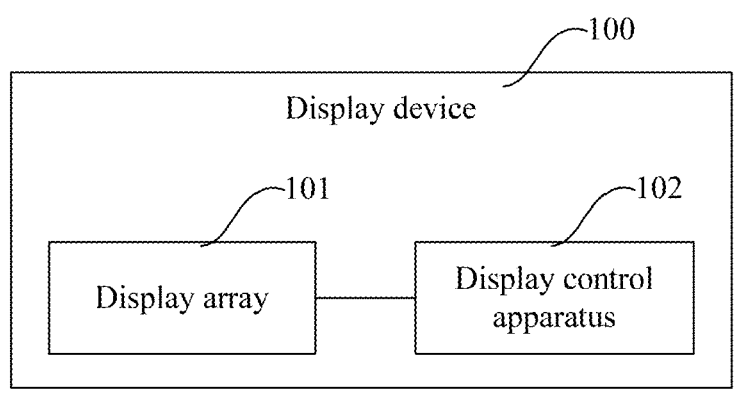
FIG. 10 is a logic block diagram of a display device according to one embodiment of the present application.

FIG. 10 is a logic block diagram of a display device according to one embodiment of the present application. As shown in FIG. 10, the display device 100 according to the embodiment of the present application may comprise: a display array 101 and a display control apparatus 102, the display array 101 and the display control apparatus 102 being in a communication connection.

The display control apparatus 102 may be any display control apparatus provided in the embodiments of the present application. Optionally, at least one display unit in the display units comprised in the display array 101 is a display unit with adjustable display pixel density, and the display unit with adjustable display pixel density may be the flexible display unit as described above. Alternatively, the display unit with adjustable display pixel density may further comprise: multiple display pixels array-distributed; and a controllable deformed material portion respectively connected with the multiple display pixels; wherein the controllable deformed material portion can produce deformation under the action of an external field, and density distribution of the multiple display pixels is correspondingly adjusted through the deformation; the external field is controlled by the display control apparatus.

Reference can be made to the corresponding description in FIG. 1b to FIG. 1j for the optional structures of the display unit with adjustable display pixel density, the display control apparatus can directly control the external field to control deformation of the controllable deformed material portion, thereby adjusting pixel point distribution of the corresponding display unit; or the display control apparatus can indirectly control the external field by controlling the deformation control portion, to cause the controllable deformed material portion to produce corresponding deformation to correspondingly adjust pixel point distribution of the display unit; and so on. A manner in which the display pixels and the deformed material portion are physically connected can be determined according to actual needs, as long as the manner can meet that pixel point distribution of the display unit can be adjusted when the deformed material portion produces deformation, which is not limited in the embodiments of the present application, and reference can be made to the corresponding description above for a specific implementation thereof, which is not repeated herein.

In the various embodiments of the present application, the serial numbers and/or sequence numbers of the foregoing embodiments are merely for the convenience of description, and do not imply the preference among the embodiments. Particular emphasis is put on the description about each embodiment, and reference can be made to relevant description of other embodiments for the content not detailed in a certain embodiment. Reference can be made to the description about the corresponding method embodiments for related description about the implementation principle or process of relevant apparatus, device or system embodiments, which is not repeated herein.

It can be appreciated by those of ordinary skill in the art that each exemplary unit and method step described with reference to the embodiments disclosed herein can be implemented by electronic hardware or a combination of computer software and electronic hardware. Whether these functions are executed in a hardware mode or a software mode depends on particular applications and design constraint conditions of the technical solution. The professional technicians can use different methods to implement the functions described with respect to a particular application, but such implementation should not be considered to go beyond the scope of the present application.

If the functions are implemented in the form of a software functional unit and is sold or used as an independent product, it can be stored in a non-transitory computer-readable storage medium. Based on such understanding, the technical solution of the present application essentially or the part which contributes to the prior art or a part of the technical solution can be embodied in the form of a software product, and the computer software product is stored in a storage medium, and comprises instructions for enabling a computer device (which can be a personal computer, a server, or a network device, and the like) to execute all or some steps of the method described in each embodiment of the present application. The foregoing storage medium comprises, a USB disk, a removable hard disk, a read-only memory (ROM), a random access memory (RAM), a magnetic disk, an optical disk or any other mediums that can store program codes.

In the embodiments of the apparatuses, methods and systems of the present application, it is apparent that the members (systems, sub-systems, modules, sub-modules, units, sub-units, and the like) or the steps can be decomposed, combined and/or recombined after decomposition. The decomposition and/or recombination should be regarded as equivalent solutions of the present application. Moreover, in the description about the embodiments of the present application, features described and/or illustrated with respect to one implementation may be used in one or more other implementations in the same or a similar manner, be combined with features in other implementations, or replace the features in other implementations.

It should be emphasized that, the term "comprise" used herein refers to existence of features, elements, steps or components, but does not exclude existence or addition of one or more other features, elements, steps or components.

Finally, it should be noted that, the above implementations are only intended to describe the present application rather than to limit the present application; various changes and variations can be made by those of ordinary skill in the art without departing from the spirit and scope of the present application, so all equivalent technical solutions also belong to the scope of the present application, and the scope of patent protection of the present application should be defined by the claims.

What is claimed is:

1. A display control method, comprising:
   displaying an image on a device comprising a display array of display units;
   determining a region of interest in the image that is to be displayed with a resolution higher than a resolution of the image;
   in response to the determination, increasing a display pixel density of display units in the display array corresponding to the region of interest, so that a pixel density in the region of interest is higher than a pixel density of display units corresponding to other regions of the image; and
   cancelling deformation of an object displayed in the region of interest caused by uneven distribution of the display units by adjusting drive information of the image according to actual position information of display pixels corresponding to the region of interest and displaying the image according to the adjusted drive information;
   wherein adjusting drive information according to actual position information of display pixels comprises:
   sampling the image to be displayed according to actual position information of display pixels with the uneven distribution, so that a pixel distribution of the image corresponds to actual positions of the display pixels.

2. The method of claim 1, wherein image contents of different regions of the image are related.

3. The method of claim 1, wherein determining a region of interest comprises:
   performing image analysis on the image; and
   determining the region of interest according to a result of the image analysis.

4. The method of claim 1, wherein the increasing a display pixel density of the display units in the display array corresponding to the region of interest comprises:
   determining deformation control information of a controllable deformed material portion of the display array; and
   controlling display pixel density distribution of display units according to the deformation control information.

5. The method of claim 4, wherein the controllable deformed material portion is at least prepared from one or more of the following controllable deformed materials: piezoelectric materials, electroactive polymers, photodeformation materials and magnetostrictive materials.

6. The method of claim 1, further comprising: acquiring portions of the image which are content-related but at least partially different.

7. The method of claim 6, wherein the acquiring portions of the image comprises: acquiring multiple focused portions in different viewing angles respectively corresponding to light field information.

8. The method of claim 7, wherein the acquiring multiple focused portions in different viewing angles respectively corresponding to light field information comprises:
   performing different spatial resolution sampling and/or different angular resolution sampling on a source light field image corresponding to the light field information, to acquire the multiple focused portions in different viewing angles respectively corresponding to the source light field image.

9. A non-transitory computer readable storage apparatus, comprising at least one executable instruction which, when executed, causes a display control apparatus to perform operations, comprising:
  displaying an image on a device comprising a display array of display units;
  determining a region of interest in the image that is to be displayed with a resolution higher than a resolution of the image;
  in response to the determination, increasing a display pixel density of display units in the display array corresponding to the region of interest, so that a pixel density in the region of interest is higher than a pixel density of display units corresponding to other regions of the image; and
  cancelling deformation of an object displayed in the region of interest caused by uneven distribution of the display units by adjusting drive information of the image according to actual position information of display pixels corresponding to the region of interest and displaying the image according to the adjusted drive information;
  wherein adjusting drive information according to actual position information of display pixels comprises:
  sampling the image to be displayed according to actual position information of display pixels with the uneven distribution, so that a pixel distribution of the image corresponds to actual positions of the display pixels.

10. A display control apparatus, comprising a processor and a memory, the memory storing computer executable instructions which, when executed, cause the display control apparatus to perform operations, comprising:
  displaying an image on a device comprising a display array of display units;
  determining a region of interest in the image that is to be displayed with a resolution higher than a resolution of the image;
  in response to the determination, increasing a display pixel density of display units in the display array corresponding to the region of interest, so that a pixel density in the region of interest is higher than a pixel density of display units corresponding to other regions of the image; and
  cancelling deformation of an object displayed in the region of interest caused by uneven distribution of the display units by adjusting drive information of the image according to actual position information of display pixels corresponding to the region of interest and displaying the image according to the adjusted drive information;
  wherein adjusting drive information according to actual position information of display pixels comprises:
  sampling the image to be displayed according to actual position information of display pixels with the uneven distribution, so that a pixel distribution of the image corresponds to actual positions of the display pixels.

11. A display device, comprising the display array and the display control apparatus of claim 10, the display array and the display control apparatus being in a communication connection.

12. The display device of claim 11, wherein at least one of the display units comprising:
  multiple array-distributed display pixels; and
  a controllable deformed material portion, respectively connected with the multiple display pixels;
  wherein the controllable deformed material portion produces deformation under an action of an external field, correspondingly adjusts density distribution of the multiple array-distributed display pixels through the deformation, and the external field is controlled by the display control apparatus.

13. The apparatus of claim 10, wherein image contents of different regions of the image are related.

14. The apparatus of claim 10, wherein the determining a region of interest comprises:
  performing image analysis on the image; and
  determining the region of interest according to a result of the image analysis.

15. The apparatus of claim 10, wherein the increasing a display pixel density of the display units in the display array corresponding to the region of interest comprises:
  determining deformation control information of a controllable deformed material portion of the display array; and
  controlling display pixel density distribution of display units according to the deformation control information.

16. The apparatus of claim 15, wherein the controllable deformed material portion is at least prepared from one or more of the following controllable deformed materials: piezoelectric materials, electroactive polymers, photodeformation materials and magnetostrictive materials.

17. The apparatus of claim 10, wherein the operations further comprising: acquiring portions of the image which are content-related but at least partially different.

18. The apparatus of claim 17, wherein the operation of acquiring portions of the image comprises: acquiring multiple focused portions in different viewing angles respectively corresponding to light field information.

19. The apparatus of claim 18, wherein the operation of acquiring multiple focused portions in different viewing angles respectively corresponding to light field information comprises:
  performing different spatial resolution sampling and/or different angular resolution sampling on a source light field image corresponding to the light field information, to
  acquire the multiple focused portions in different viewing angles respectively corresponding to the source light field image.

* * * * *